(12) United States Patent
Zhu et al.

(10) Patent No.: US 10,468,957 B2
(45) Date of Patent: Nov. 5, 2019

(54) LINEAR VIBRATION MOTOR

(71) Applicant: GOERTEK INC., Weifang (CN)

(72) Inventors: Yueguang Zhu, Weifang (CN); Baoyu Liu, Weifang (CN)

(73) Assignee: GOERTEK INC., Weifang (CN)

( * ) Notice: Subject to any disclaimer, the term of this patent is extended or adjusted under 35 U.S.C. 154(b) by 61 days.

(21) Appl. No.: 15/764,675

(22) PCT Filed: Jul. 8, 2016

(86) PCT No.: PCT/CN2016/089369
§ 371 (c)(1),
(2) Date: Mar. 29, 2018

(87) PCT Pub. No.: WO2017/152559
PCT Pub. Date: Sep. 14, 2017

(65) Prior Publication Data
US 2018/0278137 A1    Sep. 27, 2018

(30) Foreign Application Priority Data
Mar. 11, 2016  (CN) .......................... 2016 1 0140455

(51) Int. Cl.
*H02K 33/00*  (2006.01)
*H02K 33/18*  (2006.01)
*H02K 33/02*  (2006.01)

(52) U.S. Cl.
CPC ............. *H02K 33/18* (2013.01); *H02K 33/02* (2013.01)

(58) Field of Classification Search
CPC .......... H02K 5/225; H02K 33/00; H02K 1/34; H02K 5/04; H02K 33/02; H02K 33/18
(Continued)

(56) References Cited

U.S. PATENT DOCUMENTS

| 4,490,815 A | 12/1984 | Umehara et al. |
| 2011/0062804 A1* | 3/2011 | Lee .................... H02K 33/18 310/30 |

(Continued)

FOREIGN PATENT DOCUMENTS

| CN | 202840898 U | 3/2013 |
| CN | 103762815 A | 4/2014 |

(Continued)

OTHER PUBLICATIONS

International Search Report and Written Opinion dated Dec. 13, 2016 for PCT Application No. PCT/CN2016/089369.
(Continued)

*Primary Examiner* — Thanh Lam
(74) *Attorney, Agent, or Firm* — Moser Taboada

(57) ABSTRACT

A linear vibration motor, comprising a housing, a stator, a vibrator, and an elastic support member (1). The vibrator comprises a mass block (2) and magnets (3). The stator comprises coils and circuit boards. The coils comprise a first coil (4) and a second coil (5). The circuit boards comprise a first coil fixing board (6) and a second coil fixing board (7). The first coil and the second coil are respectively located on two opposite sides of the mass block. The first coil is connected with the first coil fixing board. The second coil is connected with the second coil fixing board. The first coil fixing board is fixed on a first washer board (8). The second coil fixing board is fixed on a second washer board (9). The first washer board and the second washer board are respectively fixed on the motor housing. The vibration motor can reduce the loss of magnetic field and improve the utilization rate of magnetic field while implementing vibration feedback on a touch operation of a user.

9 Claims, 2 Drawing Sheets

(58) Field of Classification Search
USPC .............................. 310/15, 21, 25, 71, 12.16
See application file for complete search history.

(56) References Cited

U.S. PATENT DOCUMENTS

| | | | | |
|---|---|---|---|---|
| 2011/0266892 A1* | 11/2011 | Wauke | ................... | B06B 1/045 |
| | | | | 310/25 |
| 2011/0316361 A1* | 12/2011 | Park | ..................... | H02K 33/16 |
| | | | | 310/25 |
| 2015/0194870 A1* | 7/2015 | Kim | ..................... | H02K 33/18 |
| | | | | 310/25 |
| 2016/0254736 A1* | 9/2016 | Jin | ........................ | H02K 33/16 |
| | | | | 310/25 |
| 2019/0081543 A1* | 3/2019 | Zhu | ........................ | H02K 33/02 |
| 2019/0081544 A1* | 3/2019 | Zhu | ........................ | H02K 33/02 |

FOREIGN PATENT DOCUMENTS

| | | |
|---|---|---|
| CN | 204721193 U | 10/2015 |
| CN | 204947873 U | 1/2016 |
| CN | 205595984 U | 9/2016 |
| JP | 1996116658 A | 5/1996 |
| JP | 2004104906 A | 4/2004 |
| JP | 2004260924 A | 9/2004 |
| KR | 20130012440 A | 2/2013 |

OTHER PUBLICATIONS

Chinese Office Action dated Sep. 30, 2017 for Application No. 201610140455.2.

\* cited by examiner

LINEAR VIBRATION MOTOR

CROSS REFERENCE TO RELATED APPLICATIONS

This application is a National Stage entry of International Application No.: PCT/CN2016/089369, filed on Jul. 8, 2016, which claims priority to Chinese Patent Application No. 201610140455.2, filed on Mar. 11, 2016. The disclosure of the priority applications are hereby incorporated in their entirety by reference.

TECHNICAL FIELD

The present disclosure relates to the technical field of electronic products, and particularly relates to a linear vibration motor.

BACKGROUND ART

Presently, the development of portable consumer electronic products is progressing rapidly, and consumers increasingly favor electronic products that are thinner and lighter and provide better touch experience. Linear vibration motors generally serve as actuating mechanisms for touch experience, and function for feedback of the vibration of the system. As the developing direction of electronic products is to be thinner and lighter, the elastic support member must be improved to be more flat. Most linear vibration motors mainly comprise a motor housing, a vibrator and a stator, and the vibrator comprises an elastic support member. The vibration of the whole linear vibration motor is realized mainly by the elastic support member. The elastic support members often used are springs and elastic sheets.

In the vibration process of vibrators, the utilization rate of magnetic field is usually low, and moment deflection is liable to happen, thereby resulting in deflected vibration, which affects the usage experience of the user.

SUMMARY OF THE DISCLOSURE

An object of the present disclosure is to provide a linear vibration motor, to solve the problem in the prior art that in the vibration process of linear vibration motors, the utilization rate of magnetic field is usually low, and moment deflection is liable to happen, thereby resulting in deflected vibration.

The present disclosure provides a linear vibration motor, comprising a motor housing, a stator, a vibrator and an elastic support member which suspends the vibrator within the motor housing and is for supporting the vibrator and providing an elastic restoring force, wherein the vibrator comprises a mass block and magnets, the stator comprises coils and circuit boards, the coil comprises a first coil and a second coil, and the circuit board comprises a first coil fixing plate and a second coil fixing plate;

the first coil and the second coil are located on two opposite sides of the mass block respectively, the first coil is connected to the first coil fixing plate, and the second coil is connected to the second coil fixing plate;

the first coil fixing plate is fixed on a first washer plate, and the second coil fixing plate is fixed on a second washer plate; and the first washer plate and the second washer plate are fixed on the motor housing respectively.

Preferably, the circuit board further comprises a transition connecting plate which is provided with a coil fixing end and a circuit connecting end, and the first coil fixing plate and the second coil fixing plate are provided on two sides of the coil fixing end of the transition connecting plate.

Preferably, the first coil fixing plate and the second coil fixing plate are arranged perpendicularly to the transition connecting plate respectively.

Preferably, a bonding pad is provided on the first coil fixing plate and the second coil fixing plate respectively.

Preferably, the motor housing comprises a first side housing and a second side housing, the first side housing comprises a first side plate, and a second side plate and a third side plate which are provided at two ends of the first side plate respectively, and the second side housing comprises a fourth side plate, and a fifth side plate and a sixth side plate which are provided at two ends of the fourth side plate respectively; and the first side housing and the second side housing are snap-fitted to form a closed space that accommodates the stator, the vibrator and the elastic support member.

Preferably, the first side plate and the fourth side plate are parallel to each other, and are parallel to the vibration direction of the vibrator.

Preferably, the second side plate and the third side plate are parallel to each other; and the fifth side plate and the sixth side plate are parallel to each other.

Preferably, the first side plate abuts and is perpendicular to the fifth side plate and the sixth side plate respectively;

the second side plate abuts and is perpendicular to the fourth side plate, the fifth side plate and the sixth side plate respectively; and the third side plate abuts and is perpendicular to the fourth side plate, the fifth side plate and the sixth side plate respectively.

Preferably, the second side housing is also provided thereon with a bonding pad.

Preferably, the number of the magnets is two, and the mass block is provided with two mounting holes for suspendedly installing the magnets.

According to the present disclosure, the linear vibration motor comprises a motor housing, a stator, a vibrator and an elastic support member, the vibrator comprises a mass block and magnets, the stator comprises coils and circuit boards, the coil comprises a first coil and a second coil, and the circuit board comprises a first coil fixing plate and a second coil fixing plate; the first coil and the second coil are located on two opposite sides of the mass block respectively, the first coil is connected to the first coil fixing plate, and the second coil is connected to the second coil fixing plate; the first coil fixing plate is fixed on a first washer plate, and the second coil fixing plate is fixed on a second washer plate; and the first washer plate and the second washer plate are fixed on the motor housing respectively. Thereby, the vibration motor can reduce the loss of magnetic field, improve the utilization rate of magnetic field, and improve the product performance while implementing vibration feedback on a touch operation of a user.

Figure 1:
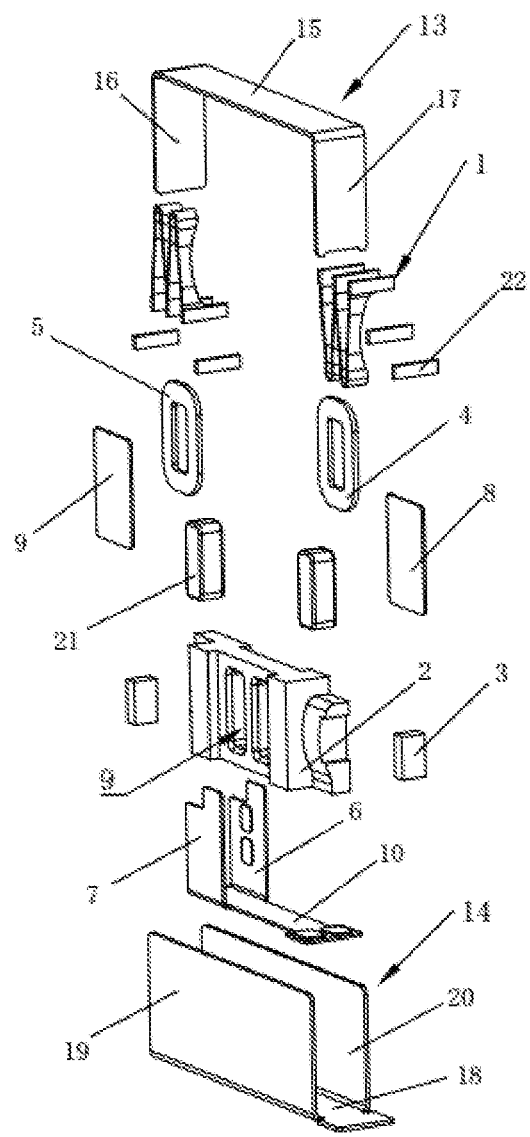
FIG. 1 is an exploded schematic diagram of a linear vibration motor in accordance with the present disclosure.

In the drawings, 1 is an elastic support member, 2 is a mass block, 3 is a magnet, 4 is a first coil, 5 is a second coil, 6 is a first coil fixing plate, 7 is a second coil fixing plate, 8 is a first washer plate, 9 is a second washer plate, 10 is a transition connecting plate, 11 is a coil fixing end, 12 is a circuit connecting end, 13 is a first side housing, 14 is a second side housing, 15 is a first side plate, 16 is a second side plate, 17 is a third side plate, 18 is a fourth side plate, 19 is a fifth side plate, 20 is a sixth side plate, 21 is a limiting block, and 22 is a stopping block.

DETAILED DESCRIPTION

In order to make the purposes, technical solutions and advantages of the present disclosure more clear, the present disclosure will be further described in detail below by referring to the drawings and embodiments. It should be understood that, the particular embodiments described herein are merely intended to explain the present disclosure, and are not used to limit the present disclosure.

FIG. 1 shows an exploded schematic diagram of a linear vibration motor in accordance with the present disclosure. In order to facilitate the understanding, the figure only shows the part that is closely related to the present disclosure.

Figure 2:
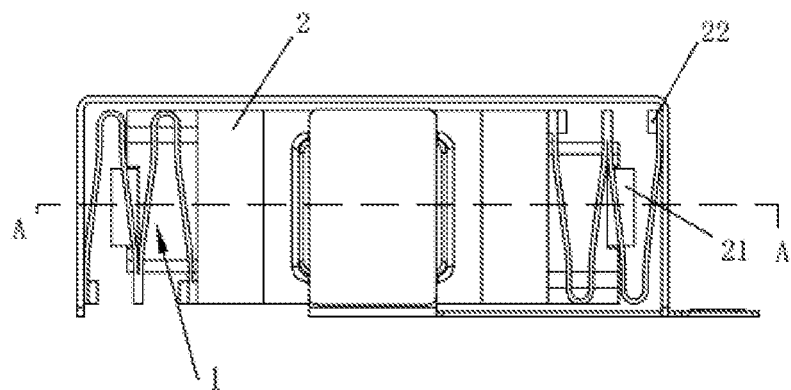
FIG. 2 is the top view of FIG. 1.
Figure 3:
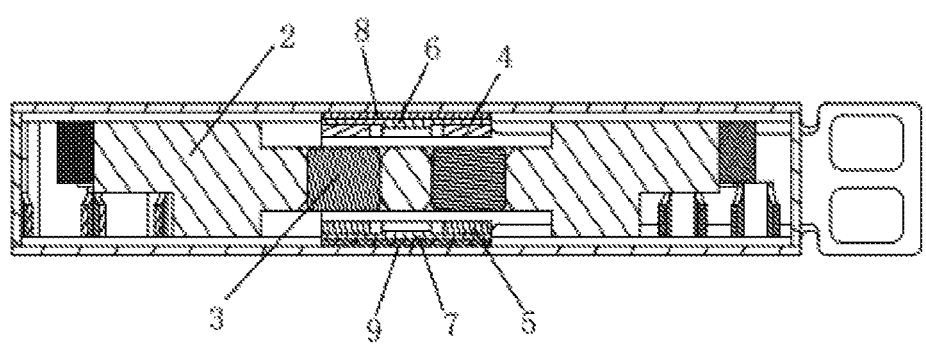
FIG. 3 is the sectional view in the AA direction in FIG. 2.
Figure 4:
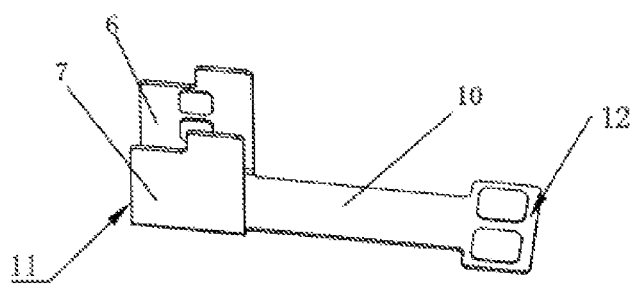
FIG. 4 is a schematic diagram of the structure of a circuit board in accordance with the present disclosure.

Referring to FIGS. 2-4, the linear vibration motor comprises a motor housing, a stator, a vibrator and an elastic support member 1; the elastic support member 1 suspends the vibrator within the motor housing, and is for supporting the vibrator and providing an elastic restoring force. The vibrator comprises a mass block 2 and magnets 3. The stator comprises coils and circuit boards, the coil comprises a first coil 4 and a second coil 5, and the circuit board comprises a first coil fixing plate 6 and a second coil fixing plate 7.

The first coil 4 and the second coil 5 are located on the two sides of the mass block 2 respectively, the first coil 4 is connected to the first coil fixing plate 6, and the second coil 5 is connected to the second coil fixing plate 7.

The first coil fixing plate 6 is fixed on a first washer plate 8, and the second coil fixing plate 7 is fixed on a second washer plate 9.

The first washer plate 8 and the second washer plate 9 are fixed on the motor housing respectively.

As shown in FIG. 3, the first coil 4 and the second coil 5 are located on the two sides of the mass block 2 respectively, and are arranged parallelly, and correspondingly, the first washer plate 8 and the second washer plate 9 are also arranged parallelly.

In the embodiment, the elastic support member 1 may be an elastic sheet or a spring structure. FIG. 1 and FIG. 2 show the case that an elastic sheet is used, and the spring supporting member is formed by welding several elastic sheets together, and is of an M shape as a whole, which is not discussed here in detail.

In the present disclosure, there are two magnets 3, and correspondingly, the mass block 2 is provided with two mounting holes for suspendedly installing the magnets 3. In order to facilitate installation and save the inner space of the entire motor housing, corresponding recess structures may be provided on the mass block 2, and the mounting holes are provided at the positions where the recesses are provided, so as to install the coils into the recesses after installing the magnets 3, as shown in FIG. 3.

As shown in FIG. 4, the circuit board further comprises a transition connecting plate 10 which is provided with a coil fixing end 11 and a circuit connecting end 12. The first coil fixing plate 6 and the second coil fixing plate 7 are provided on the two sides of the coil fixing end 11 of the transition connecting plate 10 respectively, and are arranged parallelly.

As shown in FIG. 1 and FIG. 4, the first coil fixing plate 6 and the second coil fixing plate 7 are arranged perpendicularly to the transition connecting plate 10 respectively.

In the embodiment, in order to fix each of the washer plates and the coils on the corresponding coil fixing plate, a bonding pad is provided on the first coil fixing plate 6 and the second coil fixing plate 7, which is not discussed here in detail.

In the present disclosure, the first washer plate 8 and the second washer plate 9 are fixed on the motor housing, and the motor housing may be configured as follows.

The motor housing comprises a first side housing 13 and a second side housing 14. The first side housing 13 comprises a first side plate 15, a second side plate 16 and a third side plate 17; the second side plate 16 and the third side plate 17 are provided at the two ends of the first side plate 15 respectively. The second side housing 14 comprises a fourth side plate 18, a fifth side plate 19 and a sixth side plate 20; the fifth side plate 19 and the sixth side plate 20 are provided at the two ends of the fourth side plate 18 respectively.

The first side housing 13 and the second side housing 14 are snap-fitted to form a closed space that accommodates the stator, the vibrator and the elastic support member 1.

The first side plate 15 and the fourth side plate 18 are parallel to each other, and are parallel to the vibration direction of the vibrator.

The second side plate 16 and the third side plate 17 are parallel to each other. The fifth side plate 19 and the sixth side plate 20 are parallel to each other. The first side plate 15 abuts and is perpendicular to the fifth side plate 19 and the sixth side plate 20. The second side plate 16 abuts and is perpendicular to the fourth side plate 18, the fifth side plate 19 and the sixth side plate 20. The third side plate 17 abuts and is perpendicular to the fourth side plate 18, the fifth side plate 19 and the sixth side plate 20.

As shown in FIG. 1, the second side housing 14 is also provided thereon with a bonding pad, to facilitate the welding between the first side housing 13 and the second side housing 14.

As shown in FIG. 1 and FIG. 2, structural members such as a limiting block 21 and a stopping block 22 are further provided within the motor housing, which is not discussed here in detail.

In the present disclosure, the first washer plate 8 and the second washer plate 9 that are located on the two sides of the mass block 2 are located between the motor housing and the coils (the first coil 4 and the second coil 5), thereby reducing the magnetic loss, increasing the utilization rate of magnetic field, and improving product performance.

The cooperation of double magnets and double coils (the first coil 4 and the second coil 5) sufficiently and effectively utilizes the magnetic field, reduces the loss, and increases the utilization rate of magnetic field, thereby providing a stronger driving force. Meanwhile, the two corresponding sides of the mass block 2 simultaneously have the driving forces provided by the magnetic field, which can prevent the moment deflection caused by asymmetric acting of the driving forces, and reduce the sinkage of the vibrator caused by the magnetic attraction force.

In the present disclosure, the linear vibration motor comprises a motor housing, a stator, a vibrator and an elastic support member 1, the vibrator comprises a mass block 2 and magnets 3, the stator comprises coils and circuit boards, the coil comprises a first coil 4 and a second coil 5, and the circuit board comprises a first coil fixing plate 6 and a second coil fixing plate 7; the first coil 4 and the second coil 5 are located on the two opposite sides of the mass block 2 respectively, the first coil 4 is connected to the first coil fixing plate 6, and the second coil 5 is connected to the second coil fixing plate 7; the first coil fixing plate 6 is fixed on a first washer plate 8, and the second coil fixing plate 7 is fixed on a second washer plate 9; and the first washer plate 8 and the second washer plate 9 are fixed on the motor housing respectively. Thereby, the vibration motor can reduce the loss of magnetic field, improve the utilization rate of magnetic field, obtain a stronger driving force of the linear vibration motor, stabilize the vibration of the vibrator, reduce deflected vibration, and improve the product performance while implementing vibration feedback on a touch operation of a user.

The above description is merely preferable embodiments of the present disclosure, and is not indented to limit the present disclosure. Any modifications, equivalent substitutions and improvements that are made within the spirit and principle of the present disclosure should fall within the protection scope of the present disclosure.

The invention claimed is:

1. A linear vibration motor, comprising a motor housing, a stator, a vibrator and an elastic support member which suspends the vibrator within the motor housing and is for supporting the vibrator and providing an elastic restoring force, wherein
   the vibrator comprises a mass block and magnets, the stator comprises coils and circuit boards, the coil comprises a first coil and a second coil, and the circuit board comprises a first coil fixing plate and a second coil fixing plate;
   the first coil and the second coil are located on two sides of the mass block respectively, the first coil is connected to the first coil fixing plate, and the second coil is connected to the second coil fixing plate;
   the first coil fixing plate is fixed on a first washer plate, and the second coil fixing plate is fixed on a second washer plate;
   the first washer plate and the second washer plate are fixed on the motor housing respectively; and
   the circuit board further comprises a transition connecting plate which is provided with a coil fixing end and a circuit connecting end, and the first coil fixing plate and the second coil fixing plate are provided on two sides of the coil fixing end of the transition connecting plate.

2. The linear vibration motor according to claim 1, wherein the first coil fixing plate and the second coil fixing plate are arranged perpendicularly to the transition connecting plate respectively.

3. The linear vibration motor according to claim 2, wherein a bonding pad is provided on the first coil fixing plate and the second coil fixing plate respectively.

4. The linear vibration motor according to claim 1, wherein the motor housing comprises a first side housing and a second side housing, the first side housing comprises a first side plate, and a second side plate and a third side plate which are provided at two ends of the first side plate respectively, and the second side housing comprises a fourth side plate, and a fifth side plate and a sixth side plate that are provided at two ends of the fourth side plate respectively; and
   the first side housing and the second side housing are snap-fitted to form a closed space that accommodates the stator, the vibrator and the elastic support member.

5. The linear vibration motor according to claim 4, wherein the first side plate and the fourth side plate are parallel to each other, and are parallel to the vibration direction of the vibrator.

6. The linear vibration motor according to claim 5, wherein the second side plate and the third side plate are parallel to each other; and
   the fifth side plate and the sixth side plate are parallel to each other.

7. The linear vibration motor according to claim 6, wherein the first side plate abuts and is perpendicular to the fifth side plate and the sixth side plate respectively;
   the second side plate abuts and is perpendicular to the fourth side plate, the fifth side plate and the sixth side plate respectively; and
   the third side plate abuts and is perpendicular to the fourth side plate, the fifth side plate and the sixth side plate respectively.

8. The linear vibration motor according to claim 7, wherein the second side housing is also provided thereon with a bonding pad.

9. The linear vibration motor according to claim 1, wherein the number of the magnets is two, and the mass block is provided with two mounting holes for suspendedly installing the magnets.

* * * * *